UNITED STATES PATENT OFFICE 2,053,881

SELENIUM CELL MANUFACTURE

Cyril S. Treacy, Scarsdale, N. Y., assignor to United Research Corporation, Long Island City, N. Y., a corporation of Delaware No Drawing. Application March 6, 1935, Serial No. 9,583

4 Claims. (Cl. 201—63)

The invention relates to the manufacture of selenium cells of the type shown in the patent to Carpenter, #1,942,958, wherein use is made of a glass support which carries a layer of platinum separated into two electrodes by a sinuous trace. Selenium is sublimed onto and bridges the gap between the adjacent electrode portions.

The present invention relates to the preparation of the metallic layer with its sinuous trace, and has for an object to facilitate engraving this trace.

I have found that if the metallic layer, such as described in lines 15 to 22 of the patent to Carpenter, #1,940,245, after being applied to the glass support in colloidal form, is fired until the platinum is fused to the glass support, it is difficult to cut a trace in the metallic layer because of its hardness, and it is also difficult to make a clean cut of the metal at the trace, without injuring the glass, because of fusion between the platinum and the glass.

These difficulties are overcome according to the present invention by pre-firing the platinum to a temperature which is insufficient to fuse the platinum to the glass, but to a temperature which is sufficient to cause the platinum to adhere to the glass even when it is wet with water, and to a temperature which is sufficient to burn out all of the carbon in the oil-of-lavender or other oil which is used as a carrier in the colloidal suspension. I find that a temperature suitable for this pre-firing is above 125 degrees centigrade, and preferably as high as 375 degrees centigrade, the glass support with its colloidal material being maintained at this temperature for five or ten minutes. Incidentally, a uniform coating of the colloidal material on the glass support, prior to pre-firing, may be obtained by spinning or revolving the glass support at a high speed, such as 11,000 R. P. M. A drop or two of the colloidal material, which may be a mixture of two parts of platinum chloride and one part of gold chloride in colloidal suspension, is placed on the glass support while it is spinning, and the spinning is stopped immediately when the proper color of the liquid layer is observed. That is to say, by observing the color of the layer, the thickness thereof as well as its uniformity can be judged. The liquid layer is then allowed to dry in air free from dust, and the blank is pre-fired as above described.

After the pre-firing operation, which may take place in an electric muffle furnace, provided with an automatic pyrometer to control the temperature thereof, I find that the metallic layer is so hard that it is a little difficult to scratch it with a penknife, and I have also discovered that this hardness can be removed by simply washing the metallic layer in warm water for a short while, whereupon the metallic layer is freed from its hard outer surface, which probably results from chemical decomposition of the colloidal material. The washed metal is suitably dried as with blotting paper.

The metallic layer can, therefore, be readily engraved after the pre-firing and washing operations, and this engraving is accomplished, without injury to the glass support, by employing a suitable cutting tool, such as a phonograph needle hardened to about the hardness of the glass support. Preferably, the glass support is soft glass, such as a good grade of window glass.

The metal cuttings resulting from this engraving operation may be readily removed and kept away from the metallic layer by dipping the pre-fired blanks, after they have been washed in water, as above described, in a solution of beeswax in carbon-tetrachloride. The tool, therefore, cuts a thread combined of wax and adherent metal.

After engraving the trace, the metal coating at the edges of the grid is then scraped away and all metal scrapings and wax are removed by washing the same in carbon-tetrachloride. The trace severs the metallic layer into a grid or interdigitated electrodes, as described in the patents referred to above and hereafter.

A plurality of such grids are then introduced into the muffle furnace, and the temperature thereof raised to 700 to 800 degrees centigrade in the course of an hour and then removed from the furnace. Thereafter, the grids are provided with a sublimed coating of selenium and suitably mounted as described in the patent to Lyons, 1,948,766, or preferably as described in the application, Serial No. 747,610, filed October 9, 1934, by Carpenter and Ross for Light Sensitive Cell.

The final firing of the grid, as above described, serves to fuse the metallic grid to the glass, as will be readily understood.

Briefly stated, therefore, the invention provides for the steps of pre-firing the metal blank to a temperature below the fusion point, removing the soluble coating on the metallic layer, engraving the sinuous trace, and firing the grid to a higher temperature to fuse the metallic grid to its glass support.

Having thus described the invention, what is claimed as new and desired to secure by Letters Patent, is:

1. The process of producing a light-sensitive cell, which comprises coating an insulating support with a colloidal suspension of a salt of a noble metal, pre-firing to decompose the coating to a metallic layer and to a temperature below the fusion point of the metal to the support, softening the pre-fired coating and thereafter engraving a sinuous trace in the metal, and firing the engraved metal to the fusion point, and subliming light-sensitive material on the engraved metal and over the trace.

2. The process according to claim 1, which comprises effecting said softening by washing the pre-fired metal to remove the soluble coating thereon.

3. The process of producing a selenium cell, which comprises coating a glass support with a colloidal suspension containing a salt of a noble metal, pre-firing the support thus coated below the fusion point of the glass but at a temperature sufficient to oxidize organic material in the coat and decompose the coat to a metallic layer, cooling and softening the pre-fired metal by washing in water, engraving a sinuous trace in the pre-fired metal, firing the engraved metal to the fusion point, subliming selenium on the fired and engraved metal.

4. The process which comprises coating soft glass with a colloidal suspension containing the chloride of a noble metal, pre-firing to a temperature of about 375 degrees centigrade, cooling the pre-fired metal, softening the pre-fired metal by washing in water, engraving a sinuous trace in the metal to sever the same into interdigitated electrodes, firing the resulting grid at a temperature of about 700 degrees centigrade, cooling, and subliming selenium on the engraved metal.

CYRIL S. TREACY.